(No Model.)

C. BARTLETT.
COLLAR PAD OR BRIDGE SUPPORT FOR HARNESS.

No. 568,890. Patented Oct. 6, 1896.

Witnesses
Perry Kingman
Alfred J. Townsend

Inventor
Charles Bartlett
by Hazard Townsend
his atty.

THE NORRIS PETERS CO., PHOTO-LITHO., WASHINGTON, D. C.

UNITED STATES PATENT OFFICE.

CHARLES BARTLETT, OF POMONA, CALIFORNIA.

COLLAR-PAD OR BRIDGE-SUPPORT FOR HARNESS.

SPECIFICATION forming part of Letters Patent No. 568,890, dated October 6, 1896.

Application filed May 27, 1896. Serial No. 593,248. (No model.)

*To all whom it may concern:*

Be it known that I, CHARLES BARTLETT, a citizen of the United States, residing at Pomona, in the county of Los Angeles and State of California, have invented new and useful Improvements in Collar-Pads or Bridge-Supports for Harness, of which the following is a specification.

My invention relates particularly to those devices which are designed to relieve the pressure upon a horse's neck when the neck becomes sore from constant work. Devices of this kind are provided with two pads, one arranged to rest upon the horse's withers at the rear of the hame, and the other to rest on the horse's neck in front of the hame, the pads being connected with each other by means of a single bridge or beam securely fastened to the top of each pad, extending across from pad to pad, and passing between the tops of the hames. At or near the mid-length of this beam a suitable connection is arranged to be attached to the collar to hold the collar elevated above the top of the neck while the horse is at work. The objection to these devices has been that owing to the construction, whereby the weight is brought upon the top of the pad, the pad is liable to become displaced on the horse's neck.

The object of my invention is to provide a device of this class which will be extremely cheap and simple in construction, more convenient in use than any heretofore produced, and one which will entirely avoid all liability of the pads becoming displaced from the horse's neck while in use.

My invention comprises the various features of construction and combinations of parts hereinafter fully set forth and claimed.

The accompanying drawings illustrate my invention.

Figure 1:
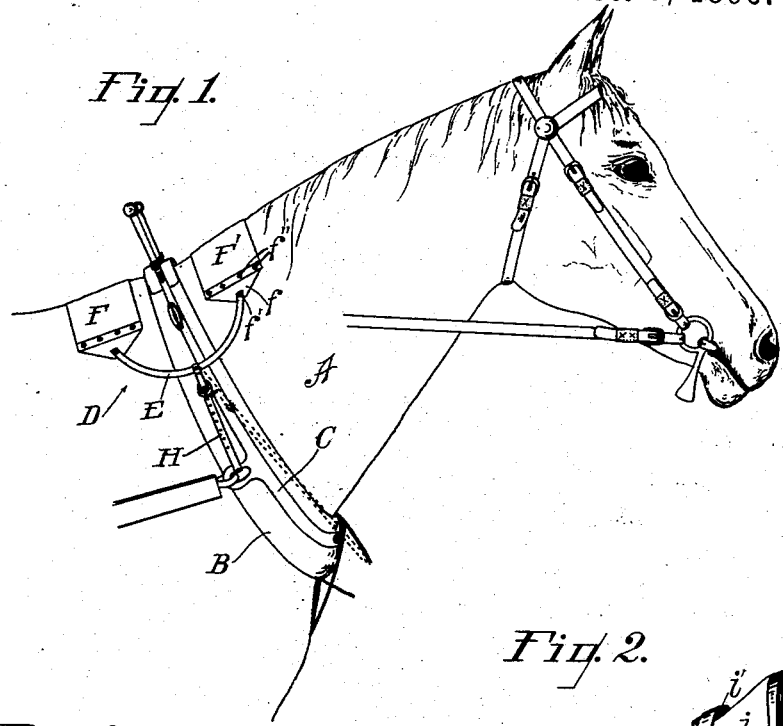
Figure 2:
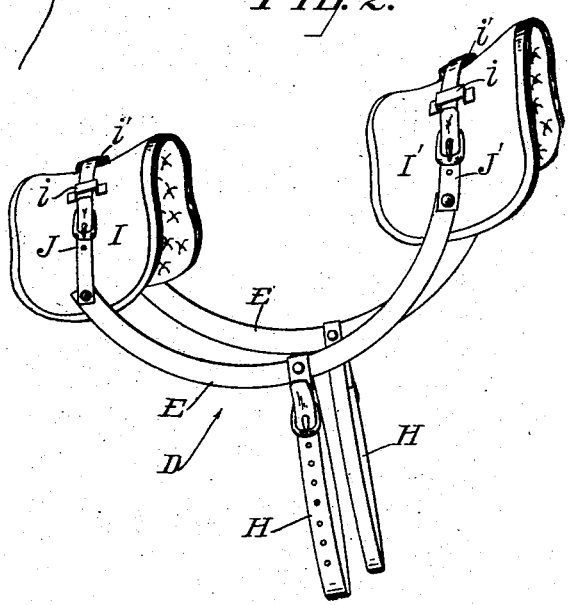
Figure 3:
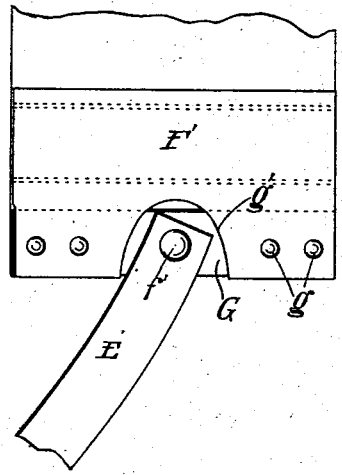

Figure 1 is a fragmental side elevation of one of my devices in practical operation upon a horse. Fig. 2 is a perspective side elevation of a modified form of my invention detached from the harness. Fig. 3 is a fragmental side elevation showing one manner of securing the end of the pad to the spreader-plate.

In the drawings, A represents a horse, and B represents a collar in place upon the horse's neck.

C is a hame of a harness.

D represents in general terms my improved bridge-pad or collar-support, which, as shown, consists of two side bars E E' and two pads F F', secured, respectively, to the side bars and connecting them with each other. These pads may be formed of canvas or other suitable flexible material, and in order to prevent the canvas from wrinkling and to retain it in its spread position I secure to each end of each side bar a triangular spreader-plate $f$, which is pivotally secured by a single rivet $f'$ to the end of the bar. To these triangles I secure the ends of the pads F F' by means of rivets $f''$. If deemed preferable, the canvas may be wrapped about a strip of strap-iron, such as indicated by G in Fig. 3, and the rivets passed through the canvas, the strap-iron, and the spreader-plate; or, if deemed preferable, a strip of leather may be sewed to the end of each pad and the rivets passed through the leather and the canvas.

I attach each side bar by independent means to the part to be supported. As shown in solid lines in Fig. 1, a strap H is secured to each side bar near its mid-length and passes thence downward and through the eye of the hame, from whence it returns and is buckled, as shown. The length of the strap may be regulated to hold the collar elevated a sufficient distance above the horse's neck to relieve the pressure. If deemed desirable, the strap may be extended and connected with the neck-yoke strap, as indicated by dotted lines in Fig. 1. In this case the weight of the collar would not be removed from the horse's neck, but the weight of the pole of the vehicle, which ordinarily causes the soreness, would be sustained by the bridge-pad.

In Fig. 2 I have shown metal pads I I' lined with some soft material and provided with straps J J', respectively, which pass loosely through eyes $i$, provided upon the pads, and over a roller $i'$, provided upon the top of each pad, so that the straps can move freely back and forth when the horse moves his neck from side to side, thus to avoid shifting the position of the pad upon the horse's neck. The ends of the straps J J' are secured to the ends of the side bars.

In the drawings I have represented the side bars as being curved, but it is to be understood that I do not limit my claims to a bridge-pad having its side bars curved.

One essential feature of my invention is that I support the collar by means of connections which are secured to the ends of the pads in contradistinction with those devices in which the supporting-beam is secured to the pads at the top thereof, or intermediate the ends of the pads.

Another advantage of my invention is that by securing the bridge-pad to the hame upon each side of the horse's neck there is no possibility of the bridge-pad becoming displaced from any cause whatever. In fact, it is an impossibility for it to slip out of place, since the horse's neck must always remain between two side bars while the harness is in position on the horse.

In Fig. 3 I have illustrated a simple manner of securing the flexible pads to the side bars and retaining them in their spread position. This is accomplished by doubling the flexible material of the pad back upon itself and securing it by stitching, then passing a piece of strap-iron G through the looped portion of the material, where it may be secured by rivets $g$, if desired. A portion of the pad may be cut away, as shown at $g'$, and the end of the side bar be riveted to the metal strap G, or the canvas may be left intact and a metal washer may be interposed between the arm and the canvas, and a rivet passed through the arm, the washer, the canvas, and the metal strap, if deemed desirable. This construction will be understood by those versed in the art, and illustration thereof is unnecessary herein.

By the construction which I employ a single rivet answers the purpose of securing each side bar to its respective end of the pad, and thereby the side bar and the pad are pivotally connected with each other, so that the pad can automatically adjust itself to the position assumed by the horse, irrespective of the position of the side bars. While this is a great advantage, still there may be instances in which such construction may not be desirable, and in such case the pads may be rigidly fixed to the bars.

In practice when the harness is removed from the horse the bridge-pad is not removed from the harness, as is necessary with the old forms of bridge-pads, and thereby considerable labor and great annoyance are avoided.

Now, having described my invention, what I claim as new, and desire to secure by Letters Patent, is—

1. A bridge-support comprising two side bars: two pads attached to and connecting the bars, and suitable means for attaching the bars to the part to be supported.

2. A bridge-support comprising two side bars: two flexible pads connecting the ends of the side bars, and means secured to the side bars intermediate the ends thereof, and adapted to be attached to the part to be supported.

3. A bridge-support comprising two side bars: pads arranged between and connecting the bars with each other: and independent means for connecting each bar with the part to be supported.

4. A bridge-support comprising two curved side bars: pads arranged between and attached to the ends of the bars: straps, one secured to each bar near its mid-length and adapted to be attached to the part to be supported.

5. In combination, the two side bars: triangular metal spreader-plates, one pivoted to each end of each bar: suitable flexible pads secured to the spreader-plates: and suitable means for independently securing each bar to the part to be supported.

6. In combination, a hame: two pads, one arranged in front and the other at the rear of the hame: two side bars connecting the pads with each other, and each attached by suitable means to its respective member of the hames.

CHAS. BARTLETT.

Witnesses:
ALFRED I. TOWNSEND,
JAMES R. TOWNSEND.